United States Patent
Saitou et al.

(10) Patent No.: US 7,271,710 B2
(45) Date of Patent: Sep. 18, 2007

(54) TIRE INFLATION PRESSURE SENSING APPARATUS SUPPLIED WITH ELECTRICAL POWER VIA WIRELESS COMMUNICATION

(75) Inventors: Takashi Saitou, Nishio (JP); Yoshinori Hanai, Kariya (JP); Akira Takaoka, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 202 days.

(21) Appl. No.: 11/132,442

(22) Filed: May 19, 2005

(65) Prior Publication Data

US 2005/0258953 A1 Nov. 24, 2005

(30) Foreign Application Priority Data

May 21, 2004 (JP) ............................. 2004-151504

(51) Int. Cl.
*B60Q 23/00* (2006.01)
*E01C 23/00* (2006.01)
*B60C 23/02* (2006.01)

(52) U.S. Cl. ...................... 340/447; 340/442; 73/146.5

(58) Field of Classification Search ................ 340/447, 340/442, 445; 73/146, 146.2, 146.5
See application file for complete search history.

(56) References Cited

U.S. PATENT DOCUMENTS 5,602,524 A 2/1997 Mock et al. ................ 340/447
6,445,287 B1* 9/2002 Schofield et al. ........... 340/442
6,612,165 B2* 9/2003 Juzswik et al. ............. 73/146.5
7,053,761 B2* 5/2006 Schofield et al. ........... 340/447
2004/0206168 A1 10/2004 Katou et al. .................. 73/146
2005/0280523 A1* 12/2005 Watabe ........................ 340/445

FOREIGN PATENT DOCUMENTS

| JP | 7-507513 | 8/1995 |
|---|---|---|
| JP | 2000-255229 | 9/2000 |
| JP | 2004-314893 | 11/2004 |

* cited by examiner

*Primary Examiner*—Toan N. Pham
(74) *Attorney, Agent, or Firm*—Posz Law Group, PLC

(57) ABSTRACT

A tire inflation pressure sensing apparatus includes a transmitter provided on a wheel of a vehicle and a receiver provided on a body of the vehicle. The transmitter includes a pressure sensor working to generate a pressure signal and a charging unit configured to be charged with electrical power via a radio wave from the receiver. The transmitter is configured to be triggered to send out the pressure signal by a change of operation of the receiver from an ON-mode, in which the receiver sends out the radio wave, to an OFF-mode in which that stops sending out the radio wave. The receiver works to change the operation thereof alternately between the ON-mode and OFF-mode in accordance with predefined processes, so that reliable transmissions of both the radio wave and the pressure signal between the transmitter and receiver are ensured without determining the relative position of the transmitter and receiver.

8 Claims, 9 Drawing Sheets

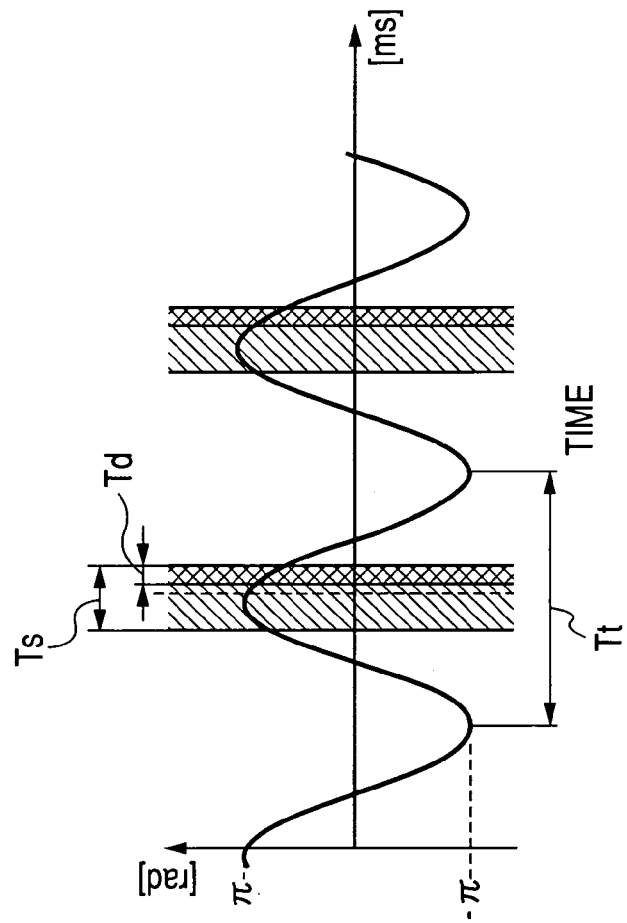
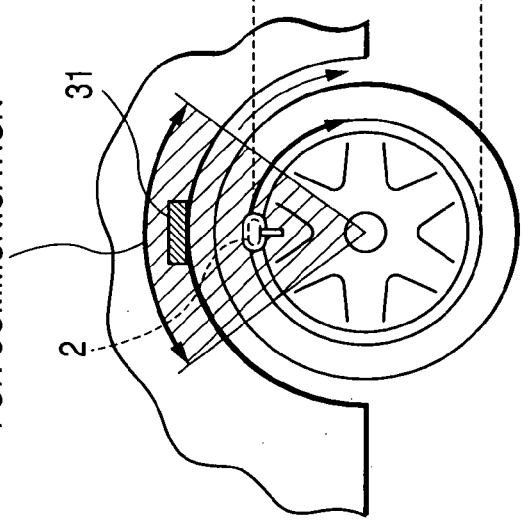
FIG. 3A
FIG. 3B
Tt: TIME REQUIRED TO COMPLETE ONE TURN
Ts: TIME REQUIRED TO PASS THROUGH POSSIBLE RANGE FOR COMMUNICATION
Td: TIME REQUIRED TO COMPLETE SENDING OUT FRAME

TIRE INFLATION PRESSURE SENSING APPARATUS SUPPLIED WITH ELECTRICAL POWER VIA WIRELESS COMMUNICATION

CROSS-REFERENCE TO RELATED APPLICATION

This application claims priority from Japanese Patent Application No. 2004-151504, filed on May 21, 2004, the content of which is hereby incorporated by reference into this application.

BACKGROUND OF THE INVENTION

1. Technical Field of the Invention

The present invention relates generally to tire inflation pressure sensing apparatuses or sensors. More particularly, the invention relates to a direct-type tire inflation pressure sensing apparatus which is configured to be supplied with electrical power via wireless communication.

2. Description of the Related Art

Conventional direct-type tire inflation pressure sensing apparatuses generally include a transmitter and a receiver. (For example, Japanese Patent No. 3212311, an English equivalent of which is U.S. Pat. No. 5,602,524, discloses such an apparatus.)

The transmitter is directly installed to a wheel of a vehicle and includes a pressure sensor working to sense an inflation pressure of a tire mounted on the wheel. The transmitter is configured to send out a pressure signal representative of the inflation pressure of the tire sensed by the pressure sensor.

The receiver is installed to the body of the vehicle and includes an antenna. The receiver is configured to receive the pressure signal from the transmitter through the antenna and determine the inflation pressure of the tire based on the received pressure signal.

In the above arrangement, the wireless communication between the transmitter and the receiver may be achieved by applying an interrogator/transponder method.

According to the interrogator/transponder method, the receiver (i.e., the interrogator) sends out through the antenna thereof a radio wave for charging the transmitter (i.e., the transponder) with electrical power. After being charged via the radio wave, the transmitter is then activated by the charged electrical power and works to send out the pressure signal toward the receiver.

Such an interrogator/transponder method is generally used in the filed of wireless ID cards. The application of the method to the direct-type tire inflation pressure sensing apparatuses provides an advantage of supplying electrical power to the transmitter without any battery being provided in the transmitter.

However, in the case of supplying electrical power by the method, the possible range of angular position of the transmitter for charge, within which the level of the radio wave received by the receiver is above a necessary level for charging the transmitter with electrical power, is very small when the transmitter rotates with rotation of the wheel.

Further, in the above case, the electrical power available for the transmitter is considerably smaller than in the case of supplying electrical power by a battery. Consequently, the level of the pressure signal sent out from the transmitter becomes considerably lower than in the letter case. As a result, the possible range of angular position of the transmitter for reception, within which the level of the pressure signal received by the receiver is above a necessary level for accurate recognition of the pressure signal, also becomes considerably small.

Accordingly, the possible range of angular position of the transmitter for communication, within which levels of the radio wave received by the transmitter and the pressure signal received by the receiver are above a necessary level for establishing a desired communication between the transmitter and the receiver, is very small.

FIGS. 9A-9B illustrates the position of the transmitter relative to the antenna of the receiver. In the figures, the antenna J1 of the receiver is installed to a fender J3 of the vehicle body such that a vertical centerline C-C of the wheel J4 passes through the antenna J1.

In this case, when the transmitter J2 rotates to, for example, an angular position where the transmitter J2 is opposed to the antenna J1 with the wheel J4 positioned therebetween, both the radio wave for electrical power charge from the antenna J1 and the pressure signal from the transmitter J2 cannot pass through the wheel J4 which is made of a metal material.

According to the results of an investigation by the inventors, in this case, the possible range of angular position of the transmitter for communication (to be referred to as possible range for communication hereinafter) may be defined as the angular range A-O-B of about 80°, which spreads out from the shaft of the wheel J4 and is symmetrical with respect to the vertical centerline C-C.

In other words, when the transmitter J2 is within the above angular range A-O-B, the transmitter J2 can reliably receive the radio wave for electrical power charge from the antenna J1 and the receiver can accurately recognize the pressure signal received thereby through the antenna J1.

Accordingly, it is required for the transmitter J2 to be charged with electrical power and triggered to send out the pressure signal toward the antenna J1 when it rotates in the angular range A-O-B. Further, it is required for the transmitter J2 to complete the sending out of the pressure signal before it passes over the angular range A-O-B.

However, it is difficult for the receiver to accurately determine the angular position of the transmitter J2 when the transmitter J2 rotates together with the wheel J4.

Moreover, to accurately determine the angular position of the transmitter J2, additional sensors or devices are required. However, this will increases the manufacturing cost and electrical power consumption of the tire inflation pressure sensing apparatus.

SUMMARY OF THE INVENTION

The present invention has been made in view of the above-mentioned problem.

It is, therefore, a primary object of the present invention to provide a tire inflation pressure sensing apparatus which has a configuration ensuring reliable transmissions of a radio wave for electrical power charge and a pressure signal without additional devices or sensors for determining the angular position of a transmitter of the tire inflation pressure sensing apparatus.

According to the present invention, a tire inflation pressure sensing apparatus includes a pressure sensor, a transmitter, a receiver, and a charging unit.

The pressure sensor is provided on a wheel of a vehicle. The pressure sensor works to sense an inflation pressure of a tire mounted on the wheel and generate a pressure signal representative of the sensed inflation pressure of the tire.

The transmitter is provided on the wheel of the vehicle. The transmitter includes a first antenna and is configured to send out the pressure signal generated by the pressure sensor through the first antenna.

The receiver is provided on a body of the vehicle. The receiver includes a second antenna and is configured to send out through the second antenna a radio wave for electrical power charge toward the transmitter, receive through the second antenna the pressure signal from the transmitter, and determine the inflation pressure of the tire based on the received pressure signal. The receiver selectively operates in an ON-mode, in which the receiver sends out the radio wave, and an OFF-mode in which the receiver stops sending out the radio wave.

The charging unit is provided on the wheel of the vehicle. The charging unit is configured to be charged with an electrical power induced by the radio wave received by the transmitter through the first antenna, and supply the electrical power to the pressure sensor and the transmitter.

In the above tire inflation pressure sensing apparatus, the transmitter has a predetermined range of angular position with respect to the receiver, within which levels of the radio wave received by the transmitter and the pressure signal received by the receiver are above a necessary level for establishing a desired communication between the transmitter and the receiver. Further, the transmitter is configured to be triggered to send out the pressure signal by a change of operation of the receiver from the ON-mode to the OFF-mode.

According to the first embodiment of the present invention, the receiver works to:

calculate a time Tt required for the transmitter to complete one turn;

calculate a time Ts required for the transmitter to pass through the predetermined range of angular position based on the time Tt;

calculate a difference T between the time Ts and a time Td required for the transmitter to complete sending out the pressure signal; and change an operation thereof alternately between the ON-mode and OFF-mode during one complete turn of the transmitter together with the wheel such that a time interval between two continuous changes from the ON-mode to the OFF-mode is equal to or less than T.

With the above configuration, the transmitter can be reliably charged with electrical power and triggered to send out the pressure signal toward the second antenna of the receiver when it rotates in the predetermined range of angular position.

Further, the transmitter can complete the sending out of the pressure signal before it passes over the predetermined range of angular position.

In the above configuration according to the first embodiment of the invention, the receiver may further work to calculate a time Tc required for completing the charge of the charging unit with electrical power when the wheel rotates based on the times Tt and Ts, and keep the operation thereof in the ON-mode for a time interval of Tc before changing the same alternately between the ON-mode and OFF-mode.

According to the second embodiment of the present invention, the receiver works to:

calculate a time Tt required for the transmitter to complete one turn;

calculate a time Ts required for the transmitter to pass through the predetermined range of angular position based on the time Tt;

calculate a difference T between the time Ts and a time Td required for the transmitter to complete sending out the pressure signal; and change an operation thereof alternately between the ON-mode and OFF-mode so as to keep the operation in the ON-mode for a time interval of (N×Tt), where N is a given integer, and in the OFF-mode for a time interval of T or less.

With the above configuration, the transmitter 2 can be reliably triggered to send out the pressure signal and complete the sending out of the pressure signal before passing over the predetermined range of angular position.

Moreover, the charging unit can be charged once for every sending out of the pressure signal, thereby ensuring sufficient electrical power for the complete sending out of the pressure signal.

In the above configuration according to the second embodiment of the invention, the integer N is preferably such that (N×Tt) is equal or most approximate to the time Tc required for completing the charge of the charging unit with electrical power when the wheel rotates.

As a consequence, the charging unit can be completely charged once for every sending out of the pressure signal.

In the configurations according to the first and second embodiment of the invention, the time Tc may be determined by the following equation:

$$Tc = (Tcs/Ts) \times Tt,$$

where Tcs is a time required for completing the charge of the charging unit with electrical power when the wheel remains stationary.

Moreover, in the configurations according to the first and second embodiment of the invention, the receiver may further work to accumulate the number of times changing the operation thereof from the ON-mode to the OFF-mode and stop changing the operation alternately between the ON-mode and OFF-mode when the accumulated number becomes no less than Tt/T.

Accordingly, according to the present invention, reliable transmissions of both the radio wave for electrical power charge and the pressure signal are ensured without additional devices or sensors for determining the angular position of the transmitter.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIGS. 3A-3B are schematic views illustrating the relation between rotation of a wheel of a vehicle and the possible range of angular position of a transmitter on the wheel for communication;

DESCRIPTION OF THE PREFERRED EMBODIMENTS

Figure 1:
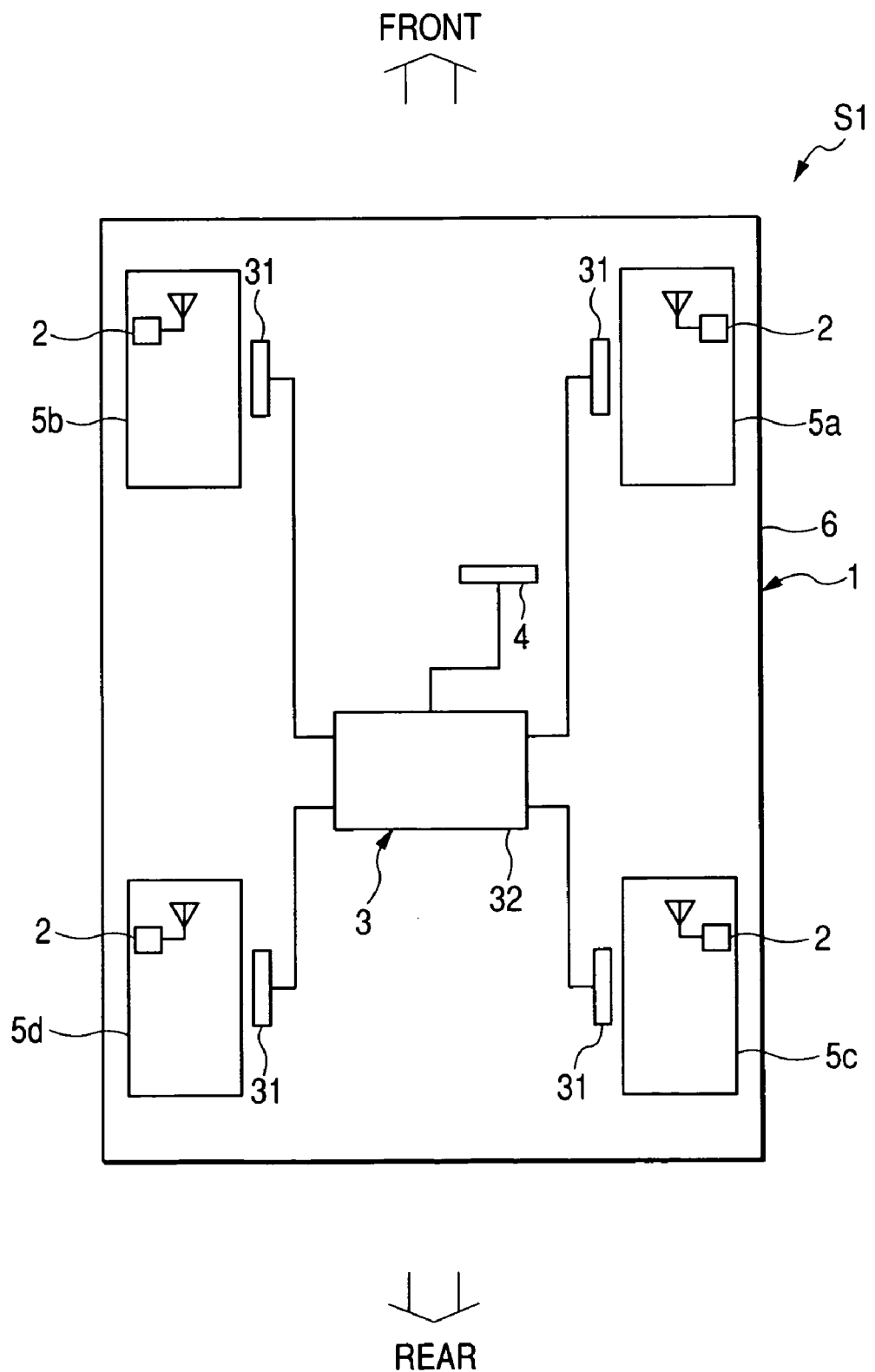
FIG. 1 is a schematic view illustrating the overall configuration of a tire inflation pressure sensing apparatus according to the first embodiment of the invention.

The preferred embodiments of the present invention will be described hereinafter with reference to FIGS. 1-8.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tire inflation pressure sensing apparatus S1 according to the first embodiment of the invention.

The tire inflation pressure sensing apparatus S1 is installed to a vehicle 1; it is configured to sense inflation pressures of four tires each of which is mounted on one of four wheels 5a-5d of the vehicle 1 (i.e., the front-right wheel 5a, the front-left wheel 5b, the rear-right wheel 5c, and the rear-left wheel 5d).

As shown in FIG. 1, the tire inflation pressure sensing apparatus S1 includes four transmitters 2, each of which is installed to one of the four wheels 5a-5d, a receiver 3 installed to the body 6 of the vehicle 1, and a warning device 4 electrically connected to the receiver 3.

Each transmitter 2 is configured to be charged with electrical power via a radio wave sent from the receiver 3. After being charged, each transmitter 2 is then activated by the charged electrical power and works to sense an inflation pressure of a corresponding one of the four tires and send out a frame that contains a signal representative of the sensed inflation pressure of the tire.

Figure 2A:
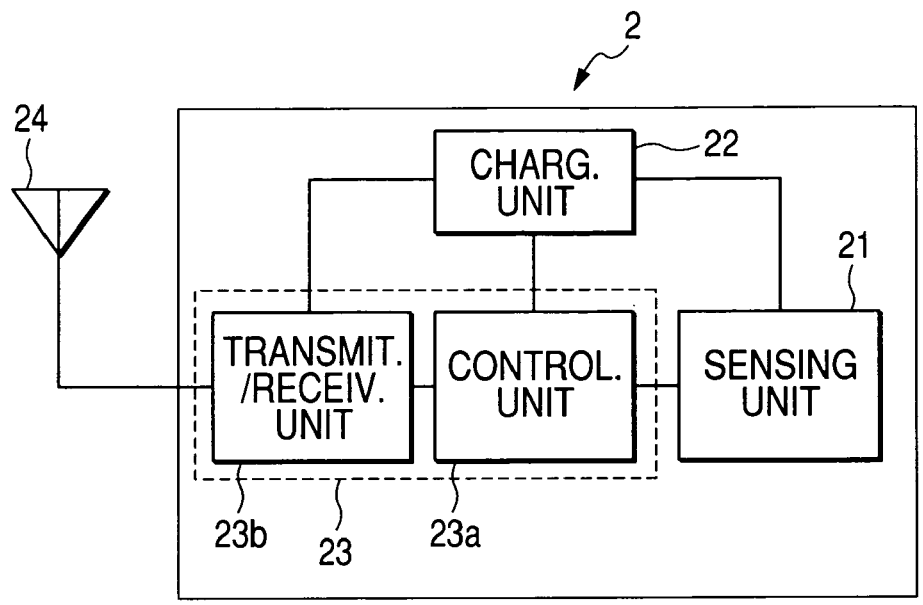
FIG. 2A is a block diagram showing the overall configuration of a transmitter of the tire inflation pressure sensing apparatus of FIG. 1.

Referring to FIG. 2A, each transmitter 2 includes a sensing unit 21, a charging unit 22, a microcomputer 23, and an antenna 24.

The sensing unit 21 is configured with sensors, such as a diaphragm-type pressure sensor and a temperature sensor, and works to output signals representative of the sensed inflation pressure of the tire and the temperature of air in the tire.

The charging unit 22 is configured to be charged with the electrical power induced by the radio wave received through the antenna 24. The charging unit 22 works to supply electrical power to the sensing unit 21 and the microcomputer 23.

The use of electrical power charging systems as the charging unit 22 is well known in the art, particularly in the field of wireless ID cards; therefore, more details thereabout are omitted hereinafter.

The microcomputer 23 is of a well-known type; it is configured with a CPU (Central Processing Unit), a ROM (READ Only Memory), a RAM (Random Access Memory), and I/O (Input/output) devices.

The microcomputer 23 functionally includes a controlling unit 23a and a transmitting/receiving unit 23b, which are realized by a program installed in the ROM when the program is activated. The two units 23a and 23b are configured to implement predetermined processes in accordance with the program.

Specifically, the controlling unit 23a receives signals outputted from the sensing unit 21 and processes those signals. Then, the controlling unit 23a stores in a frame those signals together with an ID signal, which is indicative of the corresponding one of the four wheels 5a-5d to which the transmitter 2 sending out those signals is installed, and provides the frame to the transmitting/receiving unit 23b.

The transmitting/receiving unit 23b receives the radio wave from the receiver 3 through the antenna 24 and provides the received radio wave to the charging unit 22 and the controlling unit 23a. The transmitting/receiving unit 23b also receives the frame provided by the controlling unit 23a and sends out the frame toward the receiver 3 through the antenna 24.

The above-described transmitters 2 each are fixed to an air valve of a corresponding wheel and at least the sensing unit 21 thereof is placed inside the tire on the wheel so as to be exposed to the air in the tire.

The receiver 3 is configured to send out the radio wave for charging the transmitters 2 with electrical power, receive frames sent out from the transmitters 2, and determine the inflation pressures of the four tires based on the signals contained in the respective frames.

Figure 2B:
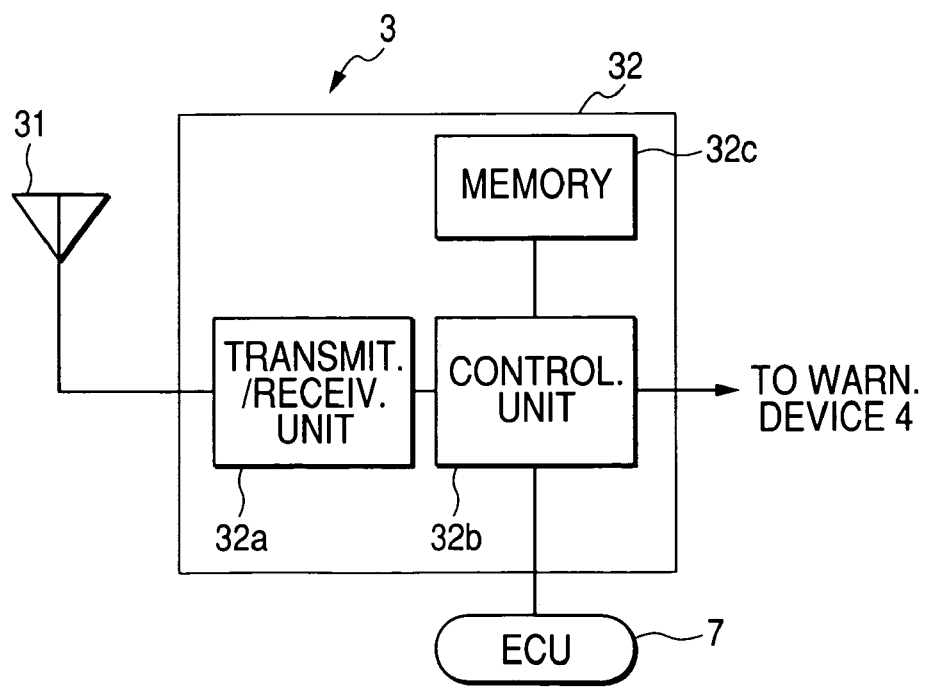
FIG. 2B is a block diagram showing the overall configuration of a receiver of the tire inflation pressure sensing apparatus of FIG. 1.

Referring to FIG. 1 and FIG. 2B, the receiver 3 includes four antennas 31 and a microcomputer 32.

Each antenna 31 is provided at a position on the body 6 of the vehicle 1 corresponding to one of the four transmitters 2. For example, each antenna 31 is positioned away from the corresponding transmitter 2 by a given distance and fixed to the body 6 of the vehicle 1.

The microcomputer 32 is of a well-known type; it is configured with a CPU, a nonvolatile EEPROM (Electronically Erasable and Programmable Read Only Memory), a RAM, I/O devices and a counter.

The microcomputer 32 functionally includes a transmitting/receiving unit 32a, a controlling unit 32b, and a memory 32c, which are realized by a program installed in the EEPROM of the microcomputer 32 when the program is activated. The two units 32a and 32b are configured to implement predetermined processes in accordance with the program.

Specifically, the transmitting/receiving unit 32a receives the radio wave provided by the controlling unit 32b and send out the received radio wave toward the transmitters 2 through the respective antennas 31. The transmitting/receiving unit 32a also receives frames sent out from the transmitters 2 through the respective antennas 31 and provides the received frames to the controlling unit 32b.

The controlling unit 32b receives a vehicle speed signal provided by an ECU 7, for example a meter ECU, of the vehicle 1, determines the rotational condition of each of the transmitters 2 based on the received vehicle speed signal, and provides the radio wave to the transmitting/receiving unit 32a according to the determined rotational condition.

Moreover, the controlling unit 32b receives the frames provided by the transmitting/receiving unit 32a, analyzes each of the ID signals contained in the frames, and identifies the corresponding wheel to which the transmitter 2 having sent out the frame is installed.

Further, the controlling unit 32b determines each of the inflation pressures of the four tires through performing signal processing and calculations based on the signals contained in the corresponding one of the frames.

Furthermore, the controlling unit 32b compares each of the determined inflation pressures of the four tires with a predefined threshold of inflation pressure and outputs a warning signal to the warning device 4 when it is lower than the predefined threshold.

The memory 32c is provided for storage of data including intermediate calculation results from the controlling unit 32b and the determined values of inflation pressures of the tires.

The warning device 4 is arranged, as shown in FIG. 1, in a place that is visible for the driver of the vehicle 1. The warning device 4 may be configured with at least one of a warning lamp, a warning display, both of which may be disposed in the instrument panel of the vehicle 1, and a warning buzzer. The warning device 4 informs a decrease in the inflation pressure of a tire to the driver upon receiving a warning signal outputted from the controlling unit 32b.

Having described the overall configuration of the tire inflation pressure sensing apparatus S1, operation thereof will be described hereinafter with reference to FIGS. 3-6.

FIGS. 3A-3B illustrates the relation between rotation of one of the wheels 5a-5d and the possible range of angular position of the transmitter 2 on the wheel for communication, As shown in FIG. 3A, when the wheel rotates, the transmitter 2 also rotates in the direction indicated with an arrow in the figure. Accordingly, the angular position of the transmitter 2 varies as shown in FIG. 3B.

When the angular position of the transmitter 2 has a possible range for communication as shown in FIGS. 3A-3B, it is required for the transmitter 2 to be charged with electrical power and triggered to send out the frame toward the antenna 31 when it rotates in the possible range for communication. Further, it is required for the transmitter 2 to complete the sending out of the frame before it passes over the possible range for communication.

According to the present invention, the receiver 3 has two operation modes. One mode is an ON-mode in which the receiver 3 sends out the radio wave through the antennas 31; the other is an OFF-mode in which the receiver 3 stops sending out the radio wave.

Moreover, according to the present invention, each of the transmitters 3 is triggered to send out the frame through the antenna 24 thereof by a change of operation of the receiver 3 from the ON-mode to the OFF-mode.

Accordingly, to reliably trigger the transmitter 2 to send out the frame, the change of operation of the receiver 3 must be made when the transmitter 2 rotates in the possible range for communication. Further, to successfully complete the sending out of the frame, the time interval from the time instant at which the change of operation of the receiver 3 is made to that at which the transmitter 2 passes over the possible range for communication must be longer than a time Td required for the transmitter 2 to complete the sending out of the frame.

Figure 4A:
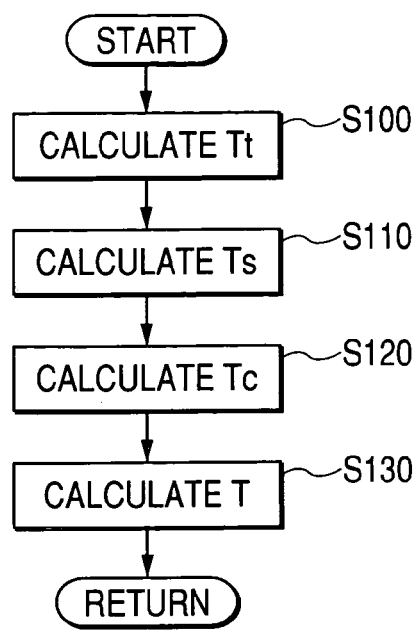
FIG. 4A is a flow chart showing a process for calculating variable parameters required to determine a time for changing the operation of the receiver of the tire inflation pressure sensing apparatus of FIG. 1.
Figure 4B:
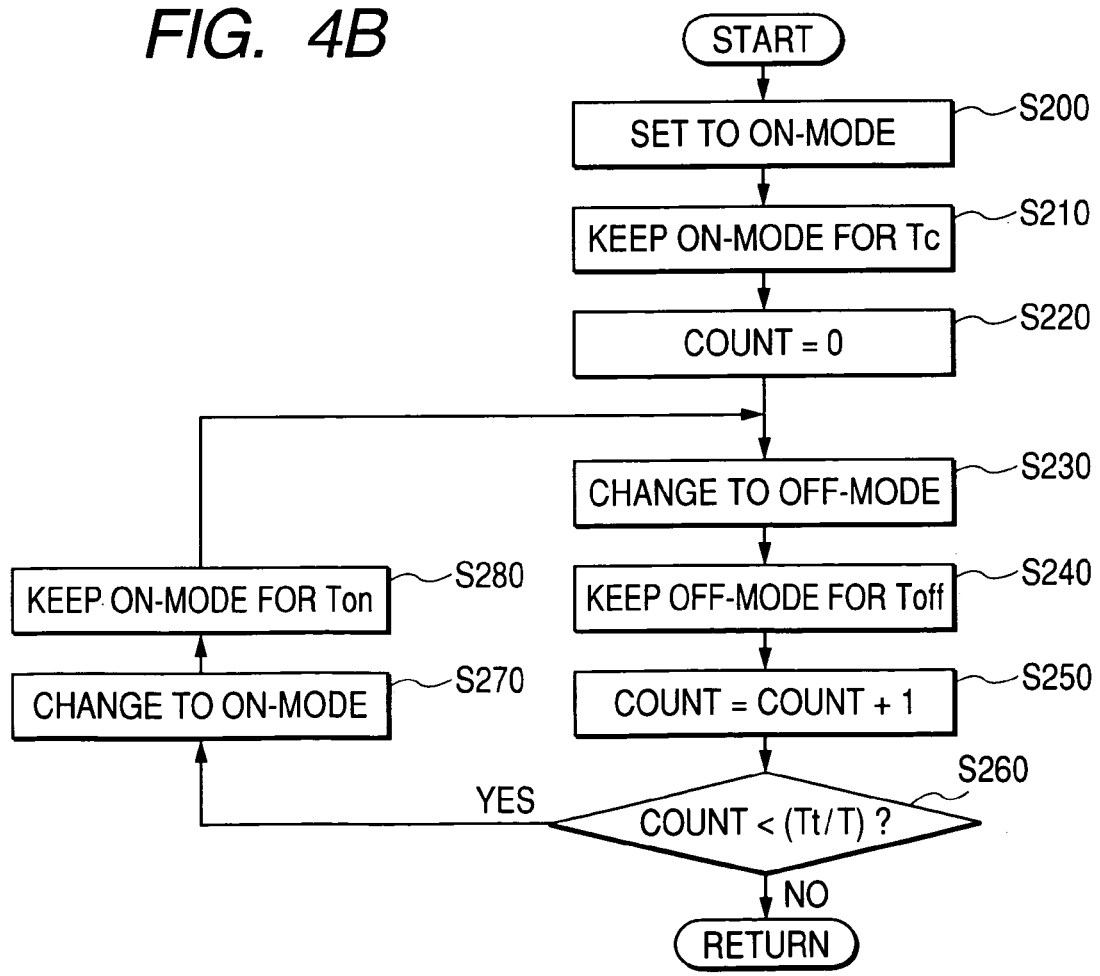
FIG. 4B is a flow chart showing a process for changing the operation of the receiver of the tire inflation pressure sensing apparatus of FIG. 1.

To this end, the controlling unit 32b of the receiver 3 is configured to perform two processes, which are respectively shown in FIGS. 4A and 4B, in parallel.

FIG. 4A shows a process for calculating variable parameters required to determine a time for changing the operation of the receiver 3; the process is performed for every time the controlling unit 32b receives the vehicle speed signal provided by the ECU 7.

Specifically, at the step S100, a time Tt required for each of the transmitters 2 (or each of the wheels 5a-5d) to complete one turn is calculated by the following equation:

$$Tt = 3600 \times (L/V),$$

where L is the circumference of the wheels 5a-5d, V is the vehicle speed, and the units for Tt, L, V are ms, m, and km/h, respectively.

At the step S110, a time Ts required for each of the transmitters 2 to pass through the possible range for communication is calculated by the following equation:

$$Ts = Tt \times (\theta s / 2\pi),$$

where θs is the possible range for communication, the unit of which is radian.

At the step S120, a time Tc required for completely charging the charging unit 22 of each of the transmitters 2 when the transmitters 2 rotate is calculated by the following equation:

$$Tc = (Tcs/Ts) \times Tt,$$

where Tcs is a time, for example, of 50 ms required for completely charging the charging unit 22 of each of the transmitters 2 when the transmitters 2 remain stationary.

At the step S130, a time difference T is calculated by the following equation:

$$T = Ts - Td,$$

where Td is a time required for each of the transmitters 2 to complete the sending out of the frame, which is predetermined based on the results of experiments by the inventors.

FIG. 4B shows a process for alternately changing the operation of the receiver 3 between the ON-mode and OFF-mode so as to trigger each of the transmitters 2 to send out the frame. This process is performed at predetermined intervals, for example, of 1 minute.

Specifically, at the step S200, the operation of the receiver 3 is set to the ON-mode so as to start sending out the radio wave for electrical power charge toward the transmitters 2 through the respective antennas 31.

At the step S210, the operation of the receiver 3 is kept in the ON-mode for a time interval of Tc, so that the charging unit 22 of each of the transmitters 2 can be completely charged with the electrical power induced by the radio wave.

At the step S220, the number COUNT of the counter of the microcomputer 32 is set to an initial value of zero. The number COUNT is used to accumulate the number of times changing the operation of the receiver 3 from the ON-mode to the OFF-mode.

At the step S230, the operation of the receiver 3 is changed from the ON-mode to the OFF-mode. At this time, if each of the transmitters 3 is in the possible range for communication, the transmitter 3 is triggered to send out the frame; otherwise, it cannot recognize the change, and accordingly cannot be triggered.

At the step S240, the operation of the receiver 3 is kept in the OFF-mode for a time interval of Toff, and at the step S250, the number COUNT is increased by 1.

At the step S260, a determination is made as to whether the number COUNT is less than (Tt/T). If it is, the process proceeds to the step S270; else, the process goes to the end thereof.

At the step S270, the operation of the receiver 3 is changed from the OFF-mode to the ON-mode, and at the step S280, the ON-mode is kept for a time interval of Ton. After that, the process returns to the step S230.

It should be noted that the times Toff and Ton are so determined that the sum of Toff and Ton is equal to T.

As a result, by repeatedly executing the steps S230-S280, the change of operation of the receiver 3 from the ON-mode to the OFF-mode is made (Tt/T) times.

Figure 5:
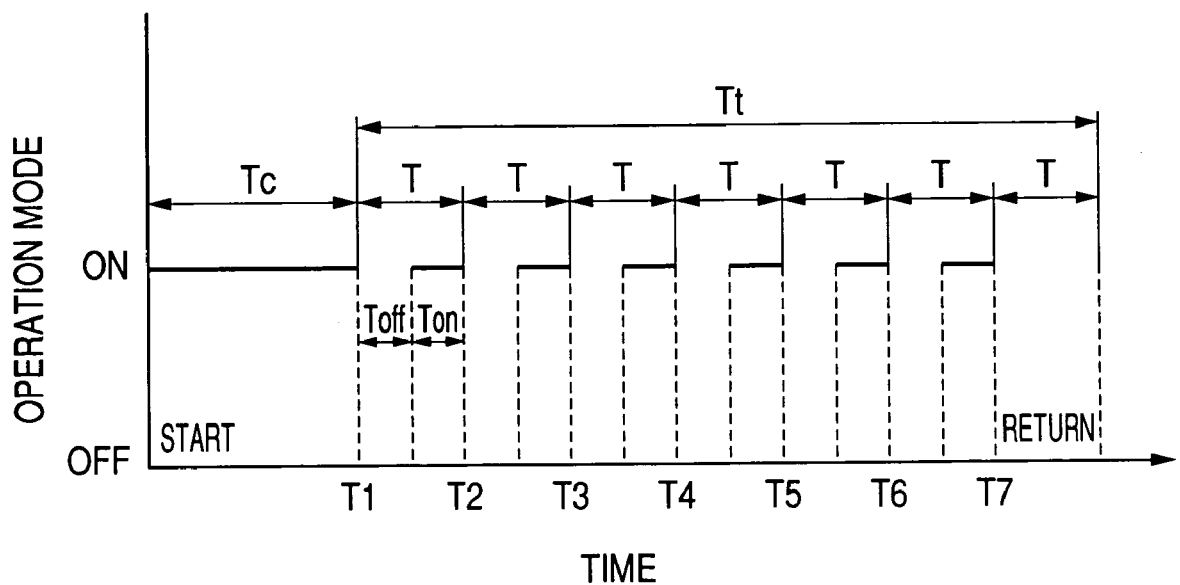
FIG. 5 is a time chart illustrating the operation of the receiver in accordance with the process of FIG. 4B.

FIG. 5 illustrates the operation of the receiver 3 in accordance with the above process, where the horizontal axis represents time, while the vertical one represents the operation mode of the receiver 3.

In FIG. 5, the value of Tt/T is equal to 7. Accordingly, there are seven time instants T1-T7, at which the operation of the receiver 3 changes from the ON-mode to the OFF-mode, during one implementation of the process. Further, all the time intervals between two continuous time instants of T1-T7 are equal to T.

Figure 6:
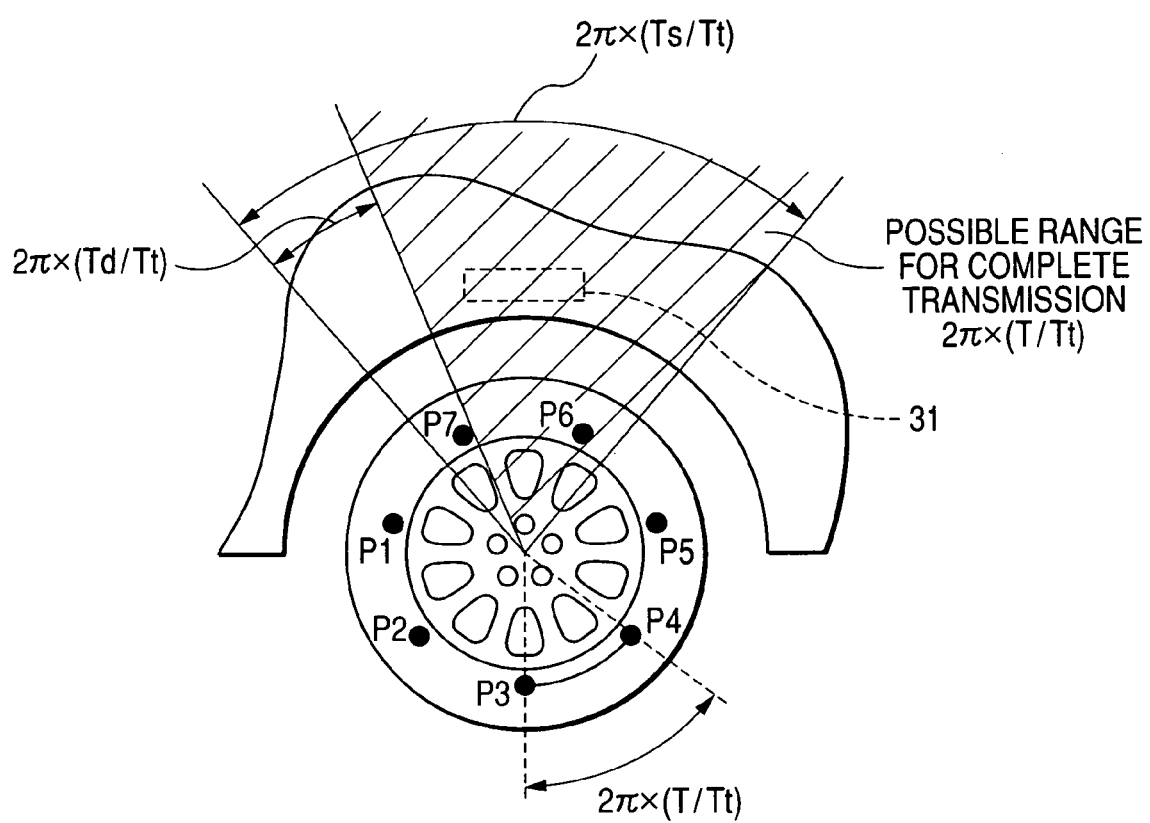
FIG. 6 is a schematic view illustrating the angular position of a transmitter of the tire inflation pressure sensing apparatus of FIG. 1 in connection with the process of FIG. 4B.

Referring now to FIG. 6, there are shown angular positions P1-P7 of one of the transmitters 2; those angular positions respectively correspond to the time instants T1-T7 in FIG. 5. Accordingly, the time required for the transmitter 2 to pass through any two continuous angular positions of P1-P7 is equal to T.

In other words, the interval between any two continuous angular positions of P1-P7 is equal to $2\pi \times (T/Tt)$. Similarly, the possible range for communication is equal to $2\pi \times (Ts/Tt)$. A range of $2\pi \times (Td/Tt)$ is also shown in FIG. 6, which corresponds to an angular range the transmitter 2 passes during the sending out of the frame.

It can be seen from FIG. 6 that, there exists at least one angular position P6 of the transmitter 2, among P1-P7, in a possible range for complete transmission that is hatched in the figure. The possible range for complete transmission is so defined that when the transmitter 2 is triggered in the range, it can complete the sending out of the frame before passing over the possible range for communication.

Accordingly, by repeatedly changing the operation of the receiver 3 from the ON-mode to the OFF-mode in accordance with the above process, the transmitter 2 is reliably triggered to send out the frame toward the receiver 3 and completes the sending out of the frame before passing over the possible range for communication at least one time.

The transmitting/receiving unit 32a of the receiver 3 receives the frame from the transmitter 2 through the corresponding antenna 31 and provides the frame to the controlling unit 32b. Then, based on all the signals contained in the frame, the controlling circuit 32b identifies the transmitter 2 and determines the inflation pressure of the tire and the temperature of air in the tire. When the determined air temperature falls out of a given range, the controlling unit 32b conducts temperature-compensation for the determined inflation pressure. After that, the controlling unit 23 compares the inflation pressure with the predefined threshold and outputs a warning signal to the warning device 4 when it is lower than the predefined threshold. The warning device 4 informs the decrease in the inflation pressure of the tire to the driver of the vehicle 1 upon receiving the warning signal from the controlling unit 32b.

To sum up, the tire inflation pressure sensing apparatus S1 according to the present embodiment includes four transmitters 2, each of which is installed to one of the four wheels 5a-5d of the vehicle 1, and a receiver 3 installed to the body 6 of the vehicle 1.

Each transmitter 2 includes a sensing unit 21 and a charging unit 22. The sensing unit 21 works to sense an inflation pressure of a tire mounted on a corresponding one of the wheels and generate a pressure signal representative of the sensed inflation pressure of the tire. The charging unit 22a is configured to be charged with electrical power induced by a radio wave sent from the receiver 3 and supply the electrical power to the receiver 3. Each transmitter 2 works to send out a frame that contains the pressure signal generated by the sensing unit 21.

The receiver 3 includes four antennas 31 each of which corresponds to one of the four transmitters 2. The receiver 3 is configured to send out through the antennas 31 the radio wave for electrical power charge, receive through the respective antennas 31 frames sent from the transmitters 2, and determine the inflation pressures of the four tires based on the received frames. The receiver 3 has two operation modes. One mode is an ON-mode in which the receiver 3 sends out the radio wave through the antennas 31; the other is an OFF-mode in which the receiver 3 stops sending out the radio wave.

The tire inflation pressure sensing apparatus S1 is characterized in that:

each transmitter 2 has a possible range of angular position for communication with respect to the receiver 3, within which levels of the radio wave received by the transmitter 2 and the pressure signal received by the receiver 3 are above a necessary level for establishing a desired communication between the transmitter 2 and the receiver 3;

each transmitter 2 is configured to be triggered to send out the frame by a change of operation of the receiver 3 from the ON-mode to the OFF-mode; and the receiver 3 works to:

calculate a time Tt required for each of the transmitters 2 to complete one turn;

calculate a time Ts required for each of the transmitters 2 to pass through the possible range of angular position for communication based on the time Tt;

calculate a difference T between the time Ts and a time Td required for each of the transmitters 2 to complete sending out the frame; and change an operation thereof alternately between the ON-mode and OFF-mode during one complete turn of each of the transmitters 2 such that a time interval between two continuous changes from the ON-mode to the OFF-mode is equal to or less than T.

With the above configuration, each of the transmitters 2 can be reliably charged with electrical power and triggered to send out the frame toward the corresponding antenna 31 when it rotates in the possible range of angular position for communication.

Further, each of the transmitters 2 can complete the sending out of the frame before it passes over the possible range of angular position for communication.

As a result, according to the present embodiment, reliable transmissions of both the radio wave for electrical power charge and the pressure signal are ensured without additional devices or sensors for determining the angular position of each of the transmitters 2.

Second Embodiment

In this embodiment, an inflation pressure sensing apparatus S2 is provided which has a configuration almost identical to that of the inflation pressure sensing apparatus S1 according to the previous embodiment. Accordingly, only the difference in configuration between the tire inflation pressure sensing apparatuses S1 and S2 is to be described below.

As described previously, in the tire inflation pressure sensing apparatus S1, the receiver 3 keeps the operation thereof in the ON-mode for a time interval of Tc so as to completely charge each of the transmitters 2 with electrical power. Then, the receiver 3 changes repeatedly the operation thereof from the ON-mode to the OFF-mode seven (i.e., Tt/T) times during one complete turn of each of the transmitters 2 so as to reliably trigger each of the transmitters 2 to send out the frame.

With the above configuration, however, each of the transmitters 2 may be triggered to send out the frame more than once during one complete turn thereof.

For example, in FIG. 6, the transmitter 2 can be triggered at the angular position P7 as well as at the angular position P6, both of which are within the possible range for communication. However, unlike the angular position P6, when the transmitter 2 is triggered at the angular position P7, it cannot complete the sending out of the frame before passing over the possible range for communication.

As a result, when the charging unit 22 of the transmitter 2 has a capacity insufficient to supply more than once electrical power for the sending out of the frame, a complete sending out of the frame cannot be ensured.

In comparison, the tire inflation pressure sensing apparatus S2 has a configuration which ensures a complete sending out of the frame as long as the charging unit 22 of the transmitter 2 has a capacity sufficient to supply electrical power only once for the sending out of the frame.

Figure 7:
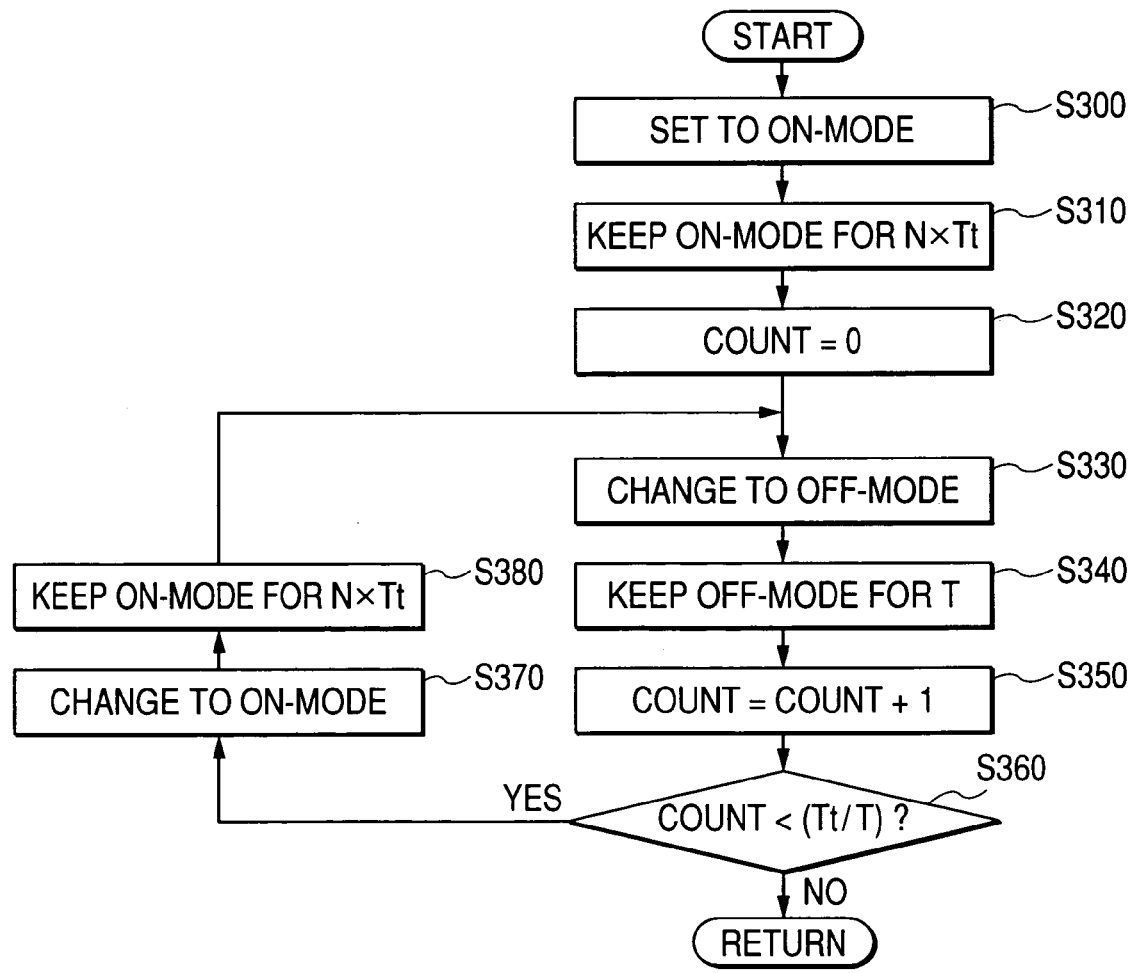
FIG. 7 is a flow chart showing a process for changing the operation of a receiver of a tire inflation pressure sensing apparatus according to the second embodiment of the invention.

FIG. 7 shows a process for alternately changing the operation of the receiver 3 of the tire inflation pressure sensing apparatus S2 between the ON-mode and OFF-mode. This process is performed at predetermined intervals, for example, of 1 minute.

At the step S300, the operation of the receiver 3 is set to the ON-mode so as to start sending out the radio wave for electrical power charge toward the transmitters 2 through the respective antennas 31.

At the step S310, the operation of the receiver 3 is kept in the ON-mode for a time interval of (N×Tt), N being an integer, so that the charging unit 22 of each of the transmitters 2 can be charged with the electrical power induced by the radio wave.

It is preferable that the integer N is such an integer that makes (N×Tt) being equal or most approximate to Tc. As a consequence, the charging unit 22 of each of the transmitters 2 can be completely charged with the electrical power.

At the step S320, the number COUNT of the counter of the microcomputer 32 is set to an initial value of zero. The number COUNT is used to accumulate the number of times changing the operation of the receiver 3 from the ON-mode to the OFF-mode.

At the step S330, the operation of the receiver 3 is changed from the ON-mode to the OFF-mode. At this time, if each of the transmitters 3 is in the possible range for communication, the transmitter 3 is triggered to send out the frame; otherwise, it cannot recognize the change, and accordingly cannot be triggered.

At the step S340, the operation of the receiver 3 is kept in the OFF-mode for a time interval of T, and at the step S350, the number COUNT is increased by 1.

At the step S360, a determination is made as to whether the number COUNT is less than (Tt/T). If it is, the process proceeds to the step S370; else, the process goes to the end thereof.

At the step S370, the operation of the receiver 3 is changed from the OFF-mode to the ON-mode, and at the step S380, the ON-mode is kept for a time interval of (N×Tt). After that, the process returns to the step S330.

As a result, by repeatedly executing the steps S330-S380, the change of operation of the receiver 3 from the ON-mode to the OFF-mode is made (Tt/T) times.

Figure 8:
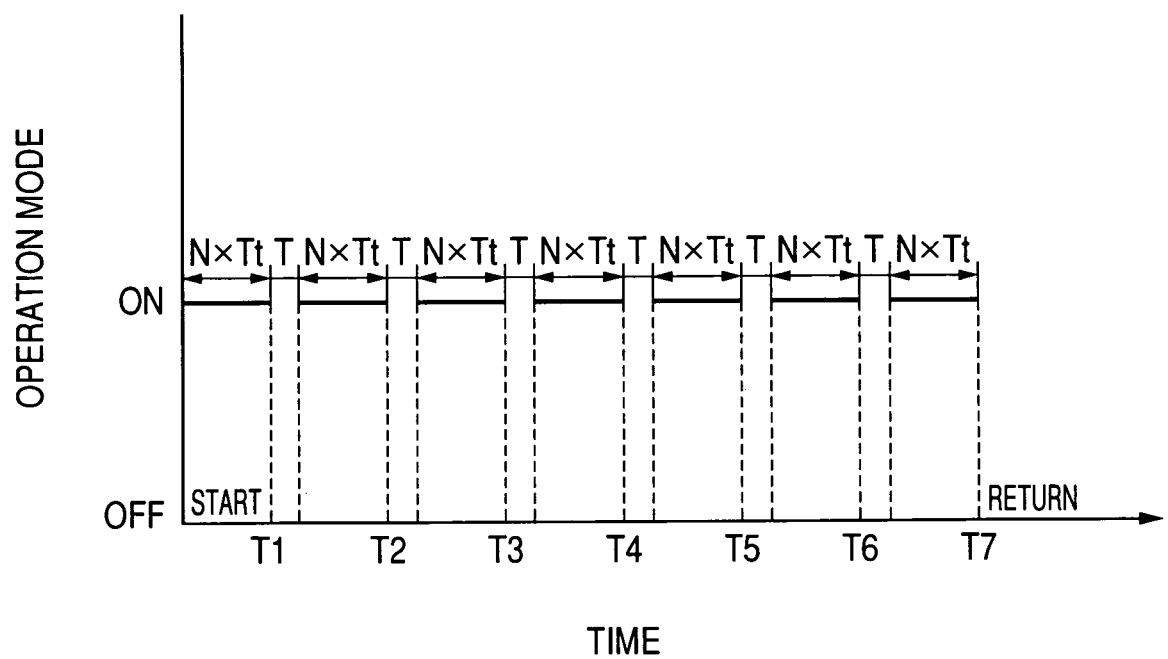
FIG. 8 is a time chart illustrating the operation of the receiver in accordance with the process of FIG. 7.
Figure 9B:
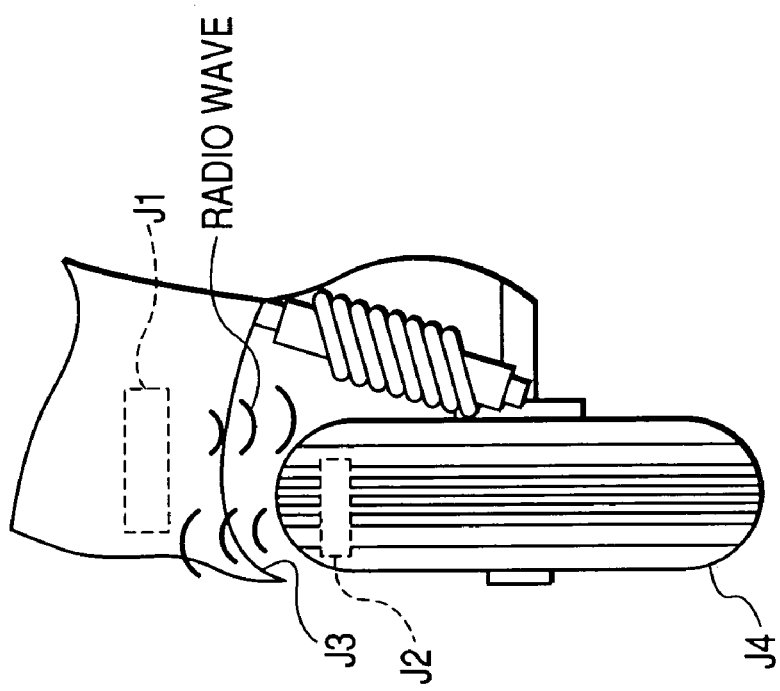
FIGS. 9A-9B are schematic views illustrating a possible range of angular position of a transmitter for communication.
Figure 9A:
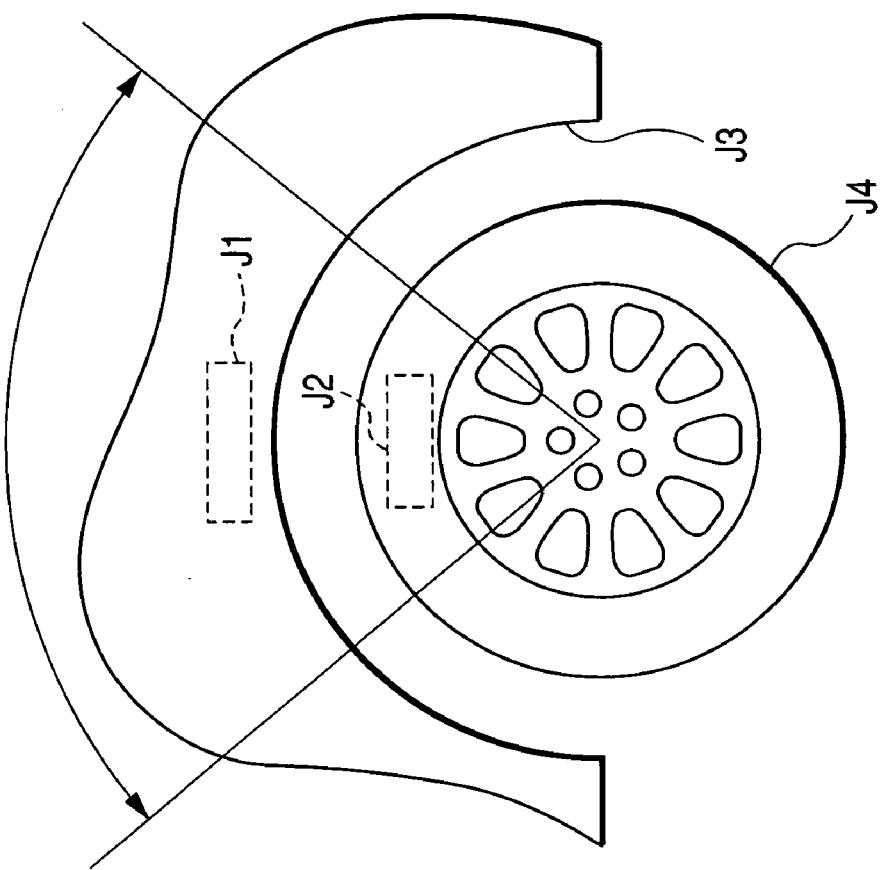

FIG. 8 illustrates the operation of the receiver 3 in accordance with the above process, where the horizontal axis represents time, while the vertical one represents the operation mode of the receiver 3.

In FIG. 8, there are seven time instants T1-T7, at which the operation of the receiver 3 changes from the ON-mode to the OFF-mode. Further, all the time intervals on which the operation of the receiver 3 is in the ON-mode are equal to (N×Tt), while those on which the operation of the receiver 3 is in the OFF-mode are equal to T. Accordingly, the time intervals between two continuous time instants of T1-T7 are equal to (N×Tt+T).

Referring again to FIG. 6, the angular positions P1-P7, which correspond to the time instants T1-T7 in FIG. 5, can also be considered to be corresponding to those in FIG. 8. However, in the present embodiment, the time required for the transmitter 2 to pass through any two continuous angular positions of P1-P7 is equal to (N×Tt+T), not just T as in the previous embodiment.

In other words, in the present embodiment, the interval between any two continuous angular positions of P1-P7 is equal to $2\pi \times (N+T/Tt)$, which is longer than that in the previous embodiment by N complete turns of the transmitter 2.

As described previously, there exists at least the angular position P6 of the transmitter 2, among P1-P7, in the possible range for complete transmission, within which the transmitter 2 can be triggered to send out the frame and complete the sending out of the frame before it passes over the range.

Accordingly, by repeatedly changing the operation of the receiver 3 from the ON-mode to the OFF-mode in accordance with the process of the present embodiment, each of the transmitters 2 can be reliably triggered to send out the frame and complete the sending out of the frame before passing over the possible range for communication at least one time during one implementation of the process.

Moreover, the charging unit 22 of each of the transmitters 2 can be completely charged once for every sending out of the frame, thereby ensuring sufficient electrical power for the complete sending out of the frame.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments of the invention, the receiver 3 has one antenna 31 for each of the transmitters 2, through which the radio wave for electrical power charge is sent from the receiver 3 to the transmitter 2 and the frame is sent from the transmitter 2 to the receiver 3.

However, the receiver 3 may have two antennas for each of the transmitters 2, through one of which the radio wave for electrical power charge is sent from the receiver 3 to the transmitter 2 and through the other of which the frame is sent from the transmitter 2 to the receiver 3.

Moreover, in the previous embodiments, the receiver 3 is configured to receive the vehicle speed signal from the ECU 7 to calculate the time Tt required for each of the transmitters 2 to complete one turn.

However, the receiver 3 may also be configured to receive a speed signal directly from a vehicle speed sensor rather than via the ECU 7. Further, the receiver 3 may also be configured to calculate the time Tt by using a wheel rotational speed signal from a wheel rotational speed sensor instead of the vehicle speed signal.

Such modifications, changes, and improvements within the skill of the art are intended to be covered by the appended claims.

What is claimed is:

1. A tire inflation pressure sensing apparatus comprising:
    a pressure sensor provided on a wheel of a vehicle, said pressure sensor working to sense an inflation pressure of a tire mounted on the wheel and generate a pressure signal representative of the sensed inflation pressure of the tire;
    a transmitter provided on the wheel of the vehicle, said transmitter including a first antenna and being configured to send out the pressure signal generated by said pressure sensor through the first antenna;
    a receiver provided on a body of the vehicle, said receiver including a second antenna and being configured to send out through the second antenna a radio wave for electrical power charge toward said transmitter, receive through the second antenna the pressure signal from said transmitter, and determine the inflation pressure of the tire based on the received pressure signal, said receiver selectively operating in an ON-mode, in which said receiver sends out the radio wave, and an OFF-mode in which said receiver stops sending out the radio wave; and
    a charging unit provided on the wheel of the vehicle, said charging unit being configured to be charged with an electrical power induced by the radio wave received by said transmitter through the first antenna, and supply the electrical power to said pressure sensor and said transmitter,
    wherein said transmitter has a predetermined range of angular position with respect to said receiver, within which levels of the radio wave received by said transmitter and the pressure signal received by said receiver are above a necessary level for establishing a desired communication between said transmitter and said receiver; and said transmitter is configured to be triggered to send out the pressure signal by a change of operation of said receiver from the ON-mode to the OFF-mode, and
    wherein said receiver works to:
    calculate a time Tt required for said transmitter to complete one turn;
    calculate a time Ts required for said transmitter to pass through the predetermined range of angular position based on the time Tt;
    calculate a difference T between the time Ts and a time Td required for said transmitter to complete sending out the pressure signal; and
    change an operation thereof alternately between the ON-mode and OFF-mode during one complete turn of said transmitter together with the wheel such that a time interval between two continuous changes from the ON-mode to the OFF-mode is equal to or less than T.

2. The tire inflation pressure sensing apparatus as set forth in claim 1, wherein said receiver further works to calculate a time Tc required for completing the charge of the charging unit with electrical power when the wheel rotates based on the times Tt and Ts, and keep the operation thereof in the ON-mode for a time interval of Tc before changing the same alternately between the ON-mode and OFF-mode.

3. The tire inflation pressure sensing apparatus as set forth in claim 2, wherein the time Tc is determined by the following equation:

$$Tc=(Tcs/Ts) \times Tt,$$

where Tcs is a time required for completing the charge of the charging unit with electrical power when the wheel remains stationary.

4. The tire inflation pressure sensing apparatus as set forth in claim 1, wherein said receiver further works to accumulate the number of times changing the operation thereof from the ON-mode to the OFF-mode and stop changing the operation alternately between the ON-mode and OFF-mode when the accumulated number becomes no less than Tt/T.

5. A tire inflation pressure sensing apparatus comprising:
    a pressure sensor provided on a wheel of a vehicle, said pressure sensor working to sense an inflation pressure of a tire mounted on the wheel and generate a pressure signal representative of the sensed inflation pressure of the tire;
    a transmitter provided on the wheel of the vehicle, said transmitter including a first antenna and being configured to send out the pressure signal generated by said pressure sensor through the first antenna;
    a receiver provided on a body of the vehicle, said receiver including a second antenna and being configured to send out through the second antenna a radio wave for electrical power charge toward said transmitter, receive through the second antenna the pressure signal from said transmitter, and determine the inflation pressure of the tire based on the received pressure signal, said receiver selectively operating in an ON-mode, in which said receiver sends out the radio wave, and an OFF-mode in which said receiver stops sending out the radio wave; and
    a charging unit provided on the wheel of the vehicle, said charging unit being configured to be charged with an electrical power induced by the radio wave received by said transmitter through the first antenna, and supply the electrical power to said pressure sensor and said transmitter,
    wherein said transmitter has a predetermined range of angular position with respect to said receiver, within which levels of the radio wave received by said transmitter and the pressure signal received by said receiver are above a necessary level for establishing a desired communication between said transmitter and said receiver; and said transmitter is configured to be triggered to send out the pressure signal by a change of operation of said receiver from the ON-mode to the OFF-mode, and
    wherein said receiver works to:

calculate a time Tt required for said transmitter to complete one turn;

calculate a time Ts required for said transmitter to pass through the predetermined range of angular position based on the time Tt;

calculate a difference T between the time Ts and a time Td required for said transmitter to complete sending out the pressure signal; and change an operation thereof alternately between the ON-mode and OFF-mode so as to keep the operation in the ON-mode for a time interval of (N×Tt), where N is a given integer, and in the OFF-mode for a time interval of T or less.

6. The tire inflation pressure sensing apparatus as set forth in claim 5, wherein the integer N is such that (N×Tt) is equal or most approximate to a time Tc required for completing the charge of the charging unit with electrical power when the wheel rotates.

7. The tire inflation pressure sensing apparatus as set forth in claim 6, wherein the time Tc is determined by the following equation:

$$Tc=(Tcs/Ts) \times Tt,$$

where Tcs is a time required for completing the charge of the charging unit with electrical power when the wheel remains stationary.

8. The tire inflation pressure sensing apparatus as set forth in claim 5, wherein said receiver further works to accumulate the number of times changing the operation thereof from the ON-mode to the OFF-mode and stop changing the operation alternately between the ON-mode and OFF-mode when the accumulated number becomes no less than Tt/T.

* * * * *